United States Patent Office 3,424,672
Patented Jan. 28, 1969

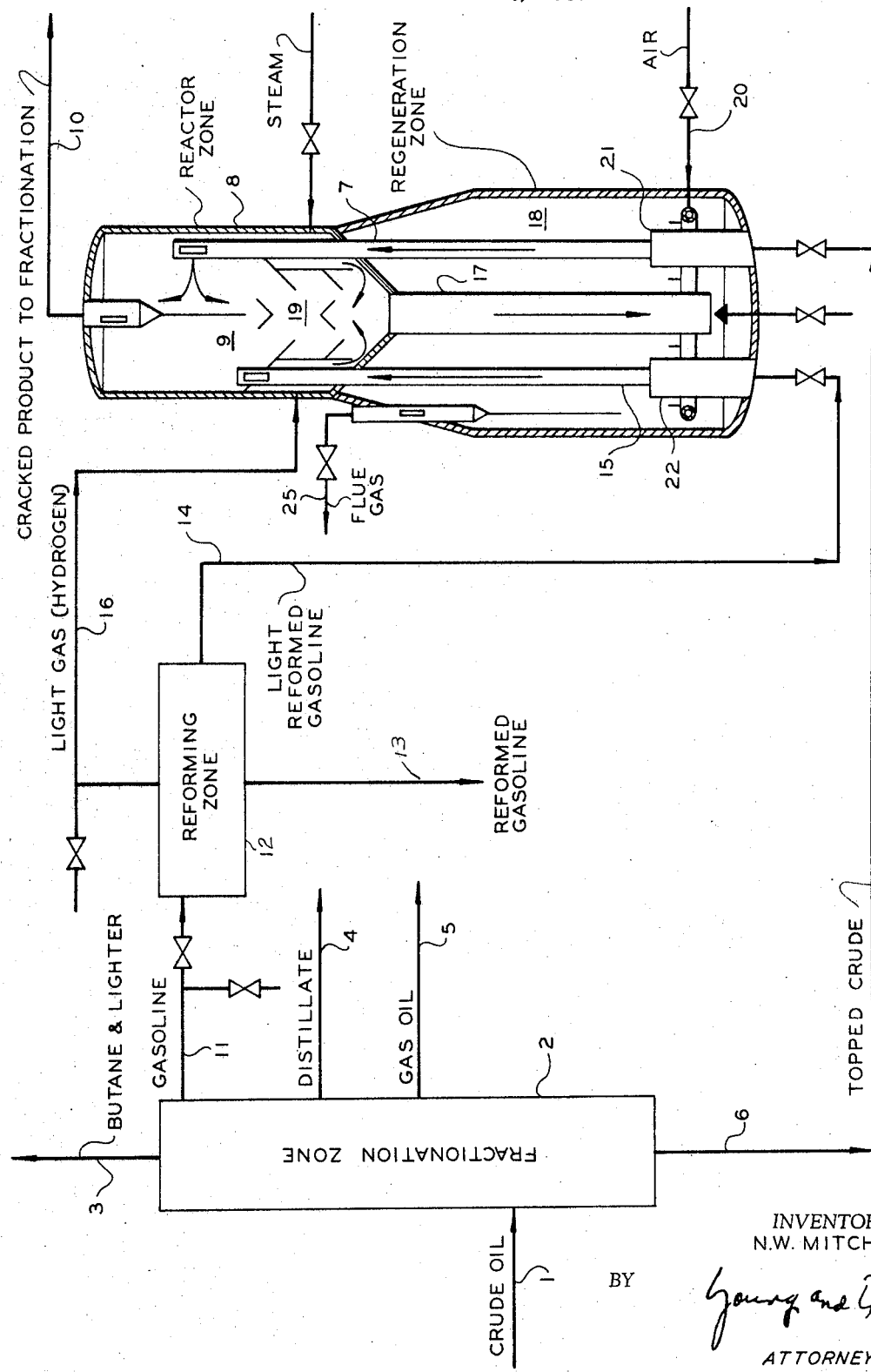

3,424,672
FLUID CATALYTIC STRIPPING
Norris W. Mitchell, Bartlesville, Okla., assignor to Phillips Petroleum Company, a corporation of Delaware
Filed Jan. 9, 1967, Ser. No. 608,018
U.S. Cl. 208—164                      2 Claims
Int. Cl. C01g *13/18*

ABSTRACT OF THE DISCLOSURE

A catalytic conversion process for oils producing high coke laydown comprising contacting oil with a cracking catalyst to produce lighter hydrocarbon products and a coke deposit on the catalyst which catalyst is discharged above and allowed to fall into a fluidized bed of catalyst which, in turn, is contacted with the effluent from a distillate oil cracking process whereby hydrogen in the latter causes further cracking of the coke on the catalyst in the fluidized bed and coke is stripped from the spent catalyst by contacting with at least one of steam and hydrogen.

---

This invention relates to a method for stripping spent catalyst in a hydrocarbon conversion zone during a hydrocarbon conversion process.

In another aspect, the invention relates to a process for the hydrocracking of petroleum residues and other heavy hydrocarbons to produce lighter hydrocarbons including those boiling in the gasoline range, including a method for regenerating spent catalyst in the hydrocracking zone comprising contacting the spent catalyst with a gas comprising hydrogen, then with sufficient steam to strip the gas from the spent catalyst, and finally subjecting the spent catalyst to oxidative regeneration.

In another aspect, the invention relates to a residual oil conversion process which includes a method for stripping spent catalyst which comprises contacting the spent catalyst with a gas comprising hydrogen, which gas is formed from hydrocarbons cracked in a riser in contact with regenerated catalyst which riser has its outlet beneath the surface of the catalytic material in the conversion zone.

In another aspect, the invention relates to a fluidized catalytic cracking process for topped crude oil which includes a method of stripping spent catalytic material by contacting the catalytic material with a gas comprising hydrogen, then with sufficient steam to strip the gaseous material from the spent catalyst, in the topped crude oil conversion zone, then pasisng the spent catalyst to a regeneration zone in which it is contacted with sufficient oxygen to regenerate it.

Catalytic cracking of hydrocarbons, including topped crude oils, uses a continuous process wherein hot, regenerated catalyst from a regeneration zone is admixed with the hydrocarbon to be catalytically cracked and passed to a reaction zone. During this endothermic reaction, a carbonaceous material is deposited on the catalyst. Thereafter, the spent (or used), cooled catalyst is stripped of occluded and adsorbed combustible materials, and is then charged to an oxidative regeneration zone to remove a portion of the residual coke or carbonaceous deposit therefrom. In the regeneration zone, therefore, the carbon content of the catalyst is lowered sufficiently to permit use of the catalyst in the cracking reaction, and the catalyst is heated to at least the minimum temperature required to effect catalytic cracking.

When residual oils such as topped crude are catalytically cracked, an acute problem arises because such residual oils deposit large amounts of coke on the catalyst. Regeneration of such high coke-content catalyst produces an intolerable heat level.

It is an object of this invention to provide a method for catalytically cracking residual oils, producing and recovering valuable hydrocarbons such as gasoline from coke deposited on the spent catalyst, in the hydrocarbon conversion zone, and to provide subsequent regeneration of spent catalyst at the desired heat level. Another object is to provide a two stage stripping method for converting heavy carbonaceous material adsorbed on spent catalyst into gasoline in a cracking zone, and to insure simultaneously that spent catalyst can undergo oxidative regeneration without exceeding the maximum heat load permitted in the operation.

Other aspects, objects, and advantages of the invention will be apparent from the disclosure, claims, and drawing.

Accordingly, the invention provides a conversion process (usually a cracking process) for oils producing high coke laydown, such as residual oil (also denoted "topped crude oil"), which includes a method for stripping coke from spent catalyst preferably in the conversion zone comprising contacting the spent catalyst with a gas comprising hydrogen, then with sufficient steam to strip the hydrogen from the spent catalyst, and finally subjecting the spent catalyst to regeneration. Usually, the catalyst is regenerated by passing it to a zone wherein it is contacted with sufficient oxygen-containing gas, i.e., air, with or without steam, to remove a substantial portion of the remaining materials adsorbed and/or occluded thereon by oxidative combustion.

In one embodiment, the invention is applicable to a fluidized catalytic cracking process wherein the hydrogen used to strip spent catalyst in the conversion zone is formed from hydrocarbons cracked in contact with fluidized, regenerated catalyst in a riser, which riser has its outlet beneath the surface of the fluidized catalytic material in the conversion zone.

The drawing diagrammatically illustrates a process embodying the method of this invention.

Referring to the drawing, crude oil, which usually has been desalted, enters and is fractioned in fractionation zone 2, which represents one or more fractionation or distillation columns, via conduit 1. Light gases comprising butane, propane, ethane, and methane emerge from zone 2 via conduit 3 for further processing as desired. Distillate is removed via conduit 4 (more than one distillate can be removed from zone 2), and gas oil via conduit 5. Residual oil, usually referred to as topped crude oil, is recovered as bottoms product via conduit 6 and is charged to fluidized catalytic cracking unit 8 via long riser 7. Regenerated catalyst from catalyst well 21 is admixed with the topped crude prior to the admixture passing up through riser 7. Catalytic cracking of the topped crude occurs in riser 7. Cracked product and used catalyst emerge from the upper end of riser 7 above the fluidized bed of catalyst 9.

The used catalyst from topped crude cracking contains a heavy residue thereon, and this used catalyst separates from the cracked products above bed 9 and enters fluidized bed 9. Cracked products, comprising light olefins, cracked gasoline, and heavier cracked oils, are removed through conduit 10 from the upper portion of the reaction zone and passed to fractionation to recover desired products.

A straight run or virgin (uncracked) gasoline is removed from zone 2 via conduit 11 and passes to reforming zone 12. Reforming (Platforming) zone 12 is a catalytic reforming zone comprising a reaction zone and fractionation facilities well known in the prior art. Such reforming processes as Platforming, Houdriforming, Powerforming, Ultraforming, and the like can be used. Platforming utilizes a fixed bed of platinum on alumina type reforming catalyst, and pressures used are in the range of 200 to 800 p.s.i.g. with temperatures in the range of 850 to 980° F. In such reforming processes a hydrogen-containing gas (hydrogen is produced in the reforming process) is recovered via conduit 16.

Reformed gasoline (having been fractionated in zone 12) is recovered as follows: the high octane heavier reformate (deheptanized product) is recovered via conduit 13 for blending or other use; the low octane light reformed gasoline, comprising heptanes, via conduit 14. This low octane reformed gasoline is charged to fluidized catalytic cracking unit 8 via short riser 15. Regenerated catalyst from catalyst well 22 is admixed with the light, low octane, reformed gasoline prior to the admixture passing up through short riser 15. Catalytic cracking of light reformed gasoline occurs, in part, in riser 15. Cracked products, unconverted hydrocarbons, and partially used catalyst emerge from the upper end of riser 15, which terminates below the upper end of riser 7, and within the fluidized catalyst bed 9. The products of cracking the light reformed gasoline comprise hydrogen, olefins, and higher octane gasoline components. This gaseous material entering the fluidized bed 9 from reactor 15 contains hydrogen, and can be used as the sole hydrogen source for converting heavy residue (coke-like residue) on the catalyst in bed 9 into more valuable hydrocarbon components, including high octane gasoline components. Alternatively, or in addition thereto, the light gas fraction 16 can be used as the source of hydrogen gas. After contacting the spent or used catalyst with hydrogen in bed 9, the used catalyst is contacted by steam in steam stripping zone 19 to remove hydrocarbons and hydrogen gas therefrom (which hydrogen gas would add heat load to the regenerator) before this used or spent catalyst enters the regeneration zone of unit 8 via downcomer 17.

Regeneration gas, usually air being used as a source of oxygen, enters regeneration zone 18 via conduit 20 to regenerate (burn off residual coke) the catalyst, which is recycled to the reaction zones via catalyst wells 21 and 22 for contact with topped crude and light reformed gasoline, respectively, as described above. Combustion or flue gas is removed from regeneration zone 18 via conduit 25.

The light reformed gasoline is partially catalytically cracked in riser 15, and is further cracked to the desired level in fluidized bed 9. Since the light reformed gasoline is more difficult to crack (more refractory) than topped crude (less refractory), the catalyst to hydrocarbon ratios used in riser 15 are higher than those used in riser 7. This results in bed 9 being at a higher temperature level than the temperature of the admixture emerging from the upper end or riser 7. From riser 7, the catalyst having heavy carbonaceous residue thereon, is passed into the hotter fluidized bed 9, and, in the presence of hydrogen-containing gas, is subjected to additional cracking to produce gasoline components therefrom, thus consuming some of the coke on the spent catalyst.

Topped crude cracking normally deposits so much coke on the catalyst (coke limited operation) that, upon regeneration, an intolerable amount of heat is generated. In the past, it was necessary to decrease the topped crude charged which also decreases the amount of desired products to prevent this conditioin. Another method used to offset the condition was to decrease conversion (lower the catalyst to oil ratio). Both methods decrease the amount of desired products from the operation.

When operating in accordance with this invention it is not necessary to decrease the amount of topped crude charged, and it is not necessary to decrease conversion. With the same amount of topped crude charged, the process of the invention affords an increase in desired gasoline product, and a decrease in the amount of coke on the spent catalyst from topped crude cracking, thus permitting rapid regeneration at the desired heat level.

SPECIFIC EXAMPLE

Operating conditions:
Reactor zone—
  Temperature, ° F. _____ 915
  Pressure, p.s.i.g. _____ 15
Regeneration zone—
  Temperature, ° F. _____ 1150
  Pressure, p.s.i.g. _____ 18
  Coke on regenerated catalyst, wt. percent _____ 0.4
Riser 7 (topped crude)—
  Outlet temperature, ° F. _____ 900
  Catalyst/oil weight ratio _____ 8:1
  Volume, barrels/day _____ 19,500
  Coke on catalyst, weight percent ____ 2.0
Riser 15 (light reformed gasoline)—
  Outlet temperature, ° F. _____ 1,000
  Catalyst to oil weight ratio _____ 25:1
  Volume, barrels/day _____ 2,298
  Coke on catalyst, wt. percent _____ 0.5
Gasoline produced from topped crude, barrels/day:[1]
  Without hydrogen-containing gas _____ 5,850
  With hydrogen-containing gas _____ 5,960
Coke on used catalyst from topped crude cracking:[1]
  Without hydrogen-containing gas, wt. percent _____ 2.0
  With hydrogen-containing gas, wt. percent __ 1.5

[1] Operating at same conditions in each system, except for hydrogen-containing gas.

The amount of hydrogen charged into the bed 9 was about 6 million standard cubic feed per day (exits from riser 15).

The crude oil charged was a West Texas crude of API gravity at 60° F. of 33.5. The topped crude comprised 25 volume percent of the crude.

The light reformed gasoline had an API gravity at 60° F. of 70, and a boiling range from 150 to 225° F.

The catalyst was a conventional silica-alumina cracking catalyst.

The above data show an increase of 110 barrels of gasoline per day, and a decrease of 0.5 weight percentum of coke on the catalyst, thus permitting regeneration of spent catalyst without intolerable temperature or heat level.

Reasonable variation and modification are possible within the spirit and scope of the invention, the essence of which is a method for stripping spent catalytic material in a residual oil conversion zone by contacting spent catalyst with a gas comprising hydrogen, then with sufficient steam to strip the hydrogen from the spent catalyst, and finally subjecting the catalyst to regeneration.

I claim:
1. A process for catalytically cracking a residual hydrocarbon oil which produces high coke laydown on the catalyst comprising:
  (a) contacting in a first riser said residual hydrocarbon oil with cracking catalyst at a first elevated temperature to produce lighter hydrocarbon products and a coke deposit on the catalyst;
  (b) contacting in a second riser a light reformate gasoline fraction with cracking catalyst at a second elevated temperature, which is higher than said first elevated temperature, to produce lighter hydrocarbon products including hydrogen;
  (c) discharging the hydrocarbon-catalyst admixture of (b) into a fluidized bed of catalyst and at least a portion of the hydrogen which is formed from said light reformate gasoline fraction in contact with catalyst in said second riser, said second riser having its outlet beneath the surface of the fluidized bed, and recovering lighter products therefrom;
  (d) discharging the hydrocarbon-highly coked catalyst admixture of (a) above to said fluidized bed whereby the hydrocarbon products are separated from the highly coked catalyst, said first riser having its outlet above the surface of the fluidized bed, and allowing the highly coked catalyst to descend into said fluidized bed of catalyst;

(e) further cracking the coke on said highly coked catalyst with the hydrogen from (b) at a temperature above said first elevated temperature to produce additional light hydrocarbon product, thereby decreasing the coke content of said highly coked catalyst;

(f) passing said catalyst from said fluidized bed to a stripping zone to remove strippable materials therefrom by contacting catalyst first with hydrogen from the reforming zone of said reformate and then with steam, and adding stripped materials to the produced hydrocarbons from (a) and (b); and (g) regenerating the stripped catalyst from (f) in an oxidative regeneration zone to produce the catalyst for both (a) and (b).

2. A process according to claim 1 wherein said residual hydrocarbon oil is a topped crude oil and wherein the catalyst to hydrocarbon ratios used in said second riser are higher than those used in said first riser thereby resulting in the fluidized bed being at a higher temperature level than the temperature of the admixture being discharged from the outlet of said first riser.

References Cited

UNITED STATES PATENTS

| | | | |
|---|---|---|---|
| 2,422,262 | 6/1947 | Russell | 208—150 |
| 2,843,460 | 7/1958 | Borey et al. | 208—164 |
| 3,161,582 | 12/1964 | Wickham | 208—164 |
| 3,188,184 | 6/1965 | Rice et al. | 208—164 |
| 3,188,185 | 6/1965 | Slyngstad et al. | 208—164 |
| 3,248,319 | 4/1966 | Bowles et al. | 208—164 |

DELBERT E. GANTZ, *Primary Examiner.*

H. LEVINE, *Assistant Examiner.*

U.S. Cl. X.R.

208—78, 150, 155